United States Patent [19]

Teng et al.

[11] 4,096,325

[45] Jun. 20, 1978

[54] METHYL HYDROXYPROPYL CELLULOSE ETHERS

[75] Inventors: James Teng; Frank Dai, both of St. Louis County; Marcella C. Stubits, St. Louis, all of Mo.

[73] Assignee: Anheuser-Busch, Incorporated, St. Louis, Mo.

[21] Appl. No.: 659,746

[22] Filed: Feb. 20, 1976

[51] Int. Cl.$^2$ .............................................. C08B 11/193
[52] U.S. Cl. ........................................ 536/91; 536/95
[58] Field of Search ...................................... 536/91, 95

[56] References Cited

U.S. PATENT DOCUMENTS

| | | | |
|---|---|---|---|
| 2,265,913 | 12/1941 | Lilienfeld | 536/91 |
| 2,306,451 | 12/1942 | Lilienfeld | 536/91 |
| 2,831,852 | 4/1958 | Savage | 536/91 |
| 3,251,824 | 5/1966 | Battista | 536/100 |
| 3,278,521 | 10/1966 | Klug | 536/95 |
| 3,388,082 | 6/1968 | Rodgers et al. | 536/91 |
| 3,453,261 | 7/1969 | Scherff | 106/197 R |
| 3,709,876 | 1/1973 | Glomski et al. | 536/91 |
| 3,839,319 | 10/1974 | Greminger et al. | 536/91 |
| 3,926,951 | 12/1975 | Lindenfors et al. | 536/91 |
| 3,940,384 | 2/1976 | Teng et al. | 536/66 |

FOREIGN PATENT DOCUMENTS

| | | | |
|---|---|---|---|
| 1,222,030 | 8/1966 | Germany | 536/95 |

*Primary Examiner*—Ronald W. Griffin
*Attorney, Agent, or Firm*—Gravely, Lieder & Woodruff

[57] ABSTRACT

This disclosure relates to the production of methyl hydroxypropyl cellulose ethers having a degree of molar substitution (M.S.) of greater than 2. The methyl hydroxypropyl cellulose ethers are prepared at low cost under mild conditions and are particularly useful in gelling organic solvents having a solubility parameter of 8 – 16. They also have compatibility for mixtures of organic solvents and water and are helpful in gelling such solutions when the percentage of water in such mixtures is up to about 60%.

5 Claims, No Drawings

METHYL HYDROXYPROPYL CELLULOSE ETHERS

BACKGROUND OF THE INVENTION

In a wide variety of application, there exists the need for products which will thicken or gel organic solvent based formulations. There also is a need for products to be used in the areas of organic-water system applications as gelling materials therefor.

Previous developments of Teng et al (one of the present inventors) have shown that esters of hydroxypropyl cellulose and starch are useful as gelling agents for organic solvents.

In Teng et al U.S. Pat. No. 3,730,693 are disclosed lipophilic polymeric carbohydrate derivatives as gelling agents, specifically cellulose laurate and starch laurate.

In Teng et al U.S. Pat. No. 3,870,701 are disclosed benzyl hydroxypropyl cellulose acetate gelling agents and Teng et al Ser. No. 387,894 filed Aug. 13, 1973, now U.S. Pat. No. 3,940,384, discloses methyl hydroxypropyl cellulose acetates as gelling agents.

Teng et al U.S. Pat. No. 3,824,085 discloses methods for producing acetate esters of hydroxypropyl cellulose which are effective gelling agents for a series of commercially important solvents. One of the reactants required for production of these esters is acetic anhydride. Because of the low yield of the acetylation reaction, it is desirable to find a reactant that has a higher percentage conversion than acetic anhdyride.

We have developed another series of effective gelling agents; namely, methyl hydroxpropyl cellulose ethers (MHPC) having a degree of substitution (D.S.) of methyl groups of 1.0 to 2.4 and a degree of molar substitution (M.S.) of hydroxypropyl groups of 2 to 8. We have found that methyl hydroxypropyl cellulose ethers gel a larger variety of organic solvents than do the acetate esters of hydroxypropyl cellulose.

The purpose of the following paragraph is to explain the use herein of the terms degree of substitution (D.S.) and degree of molar substitution (M.S.).

The degree of substitution is defined as the average number of hydroxyl groups substituted per anhydroglucose unit. The maximum number of hydroxyl groups per anhydroglucose unit is three, and therefore the theoretical maximum degree of substitution is also three in the case of monofunctional substituents. In the case of polyfunctional or polymerizable substitutents that can react not only with the hydroxyl groups of the polysaccharide but also with themselves, the number of substituents is no longer limited by the three available hydroxyl groups on the anhydroglucose unit. The term degree of molar substitution, (M.S.), is adopted and defined simply as the number of moles of substituent per anhydroglucose unit. There is no theoretical maximum value for the degree of molar substitution, (M.S.).

Methyl hydroxypropyl cellulose ethers have been synthesized by the hydroxypropylation of cellulose, followed by a methylation step. Although methyl hydroxypropyl cellulose ethers are disclosed in U.S. Pat. No. 2,831,852, the methyl hydroxypropyl cellulose ethers of the present invention are clearly distinguishable from those of U.S. Pat. No. 2,831,852 due to the different M.S. of hydroxypropyl groups and D.S. of methyl groups. Furthermore, methyl hydroxypropyl cellulose ethers of the present invention show solubility and gelling characteristics that are not possible with those of the methyl hydroxypropyl cellulose ethers of U.S. Pat. No. 2,831,852 when combined in organic solvents.

A comparison of certain of the chemical and physical properties of the methyl hydroxypropyl cellulose ethers of U.S. Pat. No. 2,831,852 and the methyl hydroxypropyl cellulose ethers of the present invention are shown in the following Table I.

TABLE I

| | M.S. of Hydroxypropyl Group | D.S. Of Methyl Group | Solubility | | |
|---|---|---|---|---|---|
| | | | Water | Carbon Tetrachloride | Toluene |
| Methyl hydroxypropyl cellulose ether of Pat. No. 2,831,852 | 0.3–1 | 1.5–2.0 | clear gel | insoluble | insoluble |
| Methyl hydroxypropyl cellulose ethers of present invention | 2–8 | 1.0–2.4 | cloudy metastable gel | clear gel | clear gel |

These gelling agents provide many desirable properties which are lacking in the presently available gelling agents. Generally, methyl hydroxypropyl cellulose ethers display greater clarity in gelling solutions than do hydroxypropyl cellulose acetates. Methyl hydroxypropyl cellulose ethers also gel with solvent-water mixtures, whereas hydroxypropyl cellulose acetates do not. Methyl hydroxypropyl cellulose ethers can gel the widest range of diverse solvents as listed in Table I. Furthermore, the ether linkages of methyl hydroxypropyl cellulose ethers are more stable to alkali, acid, and water than the ester linkages of hydroxypropyl cellulose acetates.

The preparation of these materials is economical, based on both material and processing costs. The reactions are run under mild conditions with no special equipment required except a pressure reactor. The reactants include cellulose, sodium hydroxide, propylene oxide, and methyl chloride (or methyl bromide or dimethyl sulfate). The use of methyl chloride is most desirable in that it is practical and efficient. Any of a number of inert solvents may be used, e.g., toluene, hexane, dimethyl formamide, dioxane. Hexane is preferred for the reason that product recovery is simplified.

The products of this invention are lipophilic polymers capable of thickening or gelling a wide variety of solvents.

Examples of solvents which are capable of being gelled with methyl hydroxypropyl cellulose ethers are seen in Table II. These organic solvents may be esters, ketones, aromatic hydrocarbons, nitriles, amides, alcohols or halogenated solvents with a solubility parameter of about 8 to about 16.

The solubility parameter is a measure of the compatibility of solutes with solvents and its definition and determinations are set forth in Polymer Handbook, edited by E. H. Immergut, Interscience Publishers (1966). The solubility parameter, "δ," is a thermodynamic property of solvents. Thermodynamic calculations show that when a solute is mixed with a solvent of equal solubility parameter, spontaneous dissolution takes place. Once the value for a given polymer is determined, it is known that other solvents with comparable values will also dissolve it.

The term solubility as used in this context has a somewhat different meaning than when it is used conventionally. Solubility is used generally to indicate the extent of interaction between a solid and a solvent. A piece of solid, when placed in a solvent, will dissolve into the solvent until the saturation point is reached. At that point, the two phases, solid and liquid, coexist at equilibrium. The amount of solute in liquid is measured as the solubility of the material in solution. However, in polymers and particularly in the case of the gelling agent of this invention, there is no obvious saturation point. When immersed in a 'compatible' solvent, the gelling agents swell and dissolve. When the solvent concentration is high, a polymer solution forms; when the solvent concentration is low only swelling and hence gelling occurs. An apparent single phase (solution or gel) is reached at all times. To examine qualitatively the compatibility of a gelling agent with a solvent, 5 grams of gelling agent is placed in 100 ml. of solvent. If only one phase is observed (gel or solution) they are compatible. When the mixture retains two phases, they are incompatible.

Table II shows examples of solvents with their corresponding solubility parameters. The methyl hydroxypropyl cellulose ethers gel solvents with solubility parameters of 8 to 16.

TABLE II

| Solvents | Solubility Parameter |
| --- | --- |
| ethyl acetate | 8.4 |
| carbon tetrachloride | 8.4 |
| toluene | 8.9 |
| methyl ethyl ketone | 9.3 |
| dioxane | 10.3 |
| pyridine | 10.3 |
| acetonitrile | 11.5 |
| dimethyl formamide | 12.1 |
| methanol | 14.5 |
| methyl formamide | 16.1 |

We have found that methyl hydroxypropyl cellulose ethers are particularly useful in gelling or thickening organic solvents at concentrations from 0.4 to 5% (W/W). The gelling agents of this invention are soluble in a wide range of organic solvents and water solvent mixtures, and are effective thickeners or gellants at 1% concentrations.

Solutions and gels may be prepared by simple agitation and heating.

SUMMARY OF THE INVENTION

This invention comprises a process of preparing methyl hydroxypropyl cellulose ethers by reaction of alkali cellulose with propylene oxide and subsequent reaction with methyl chloride to produce products with molar substitution (M.S.) of hydroxypropyl groups of about 2 to about 8 and degree of substitution (D.S.) of methyl groups of about 1.0 to about 2.4. These cellulose ethers gel organic solvents, such as toluene, carbon tetrachloride, ethyl acetate, dioxane.

They also gel solvent-water mixtures. They can be used as emulsifiers in organic-water solvent systems.

DETAILED DESCRIPTION

From about 40 to about 45 grams cellulose is made alkaline in about 0.5 to about 1 liter of an organic solvent. Suitable solvents are toluene, hexane, and dimethyl formamide, with toluene preferred because uniform product is prepared from this reaction medium. The alkali cellulose mixture is reacted with 40 to 300 grams propylene oxide in a pressure vessel at a pressure of 15 to 30 psi. The vessel is heated for 5 to 7 hours at temperatures ranging from about 65° C. to 110° C. After the hydroxypropylation is completed to a M.S. of 0.5 to 7.0 the remaining solvent is decanted. The crude hydroxypropyl cellulose is methylated by adding 20 to 200 grams sodium hydroxide, 18 to 180 grams water, 40 to 400 grams methyl chloride and 0.5 to 1.0 liter hexane or other suitable solvent. The reaction is carried out at 40° C. to 75° C. for about 1 to 4 hours. When the degree of substitution of methyl group is 1.0 to 2.4, the excess solvent is removed. The methyl hydroxypropyl cellulose product is slurried in warm water and the pH of the slurry is adjusted to 7.0. The product is washed with warm water and then dried.

The amount of methyl hydroxypropyl cellulose ether required for gelling purposes is at least about 0.5 grams per 100 ml. of solvent and may be as much as about 20 grams per 100 ml. The amount generally used is 2 grams per 100 ml. solvent to be gelled.

The final gel has a specific gravity approximating that of the solvent.

The methyl hydroxypropyl cellulose dispersion is allowed to stand and achieve maximum solvation to complete gelation of thickening.

Table III shows the gelling properties of methyl hydroxypropyl cellulose ethers and hydroxypropyl cellulose acetates (U.S. Pat. No. 3,824,085) in various organic solvents, water, and mixtures consisting of organic solvents and water.

TABLE III

| Solvent | Methyl Hydroxypropyl Cellulose Ethers (D.S. 1.0–2.4; M.S. 2–8) | Hydroxypropyl Cellulose Acetates (D.S. 1.0–2.0; M.S. 2–8) |
| --- | --- | --- |
| Propylene glycol | clear gel | insoluble |
| Toluene | clear gel | clear gel |
| Carbon Tetrachloride | clear gel | clear gel |
| Ethyl acetate | clear gel | hazy gel |
| Dioxane | clear gel | very slight hazy gel |
| Dimethyl formamide | clear gel | clear gel |

TABLE III-continued

| Solvent | Methyl Hydroxypropyl Cellulose Ethers (D.S. 1.0–2.4; M.S. 2–8) | Hydroxypropyl Cellulose Acetates (D.S. 1.0–2.0; M.S. 2–8) |
| --- | --- | --- |
| Pyridine | clear gel | clear gel |
| Methyl ethyl Ketone | clear gel | slightly hazy gel |
| Acetonitrile | very slightly hazy gel | hazy gel |
| Hexane | insoluble | insoluble |
| Water-Ethanol Mixtures | | |
| 10% water-90% Ethanol | clear gel | clear gel |
| 20% water-80% Ethanol | clear gel | hazy gel |
| 40% water-60% Ethanol | clear gel | insoluble |
| 60% water-40% Ethanol | hazy gel | insoluble |
| 100% water | cloudy metastable gel | insoluble |

EXAMPLE 1

In this example, 21 g. of 23.8% aqueous NaOH solution was added to 40 g. shredded cellulose and 470 ml. toluene, and the resulting mixture was stirred for 45 minutes at 25° C. The alkali cellulose mixture was then placed in a pressure vessel along with 160 ml. of propylene oxide. (The air in the vessel was purged with nitrogen at 70 psi three times). The vessel was then heated at 65° C. for ½ hour, 75° C. for 1 hour, 85° C. for 1 hour, and 95° C. for 3 hours. At the end of this period, the hydroxypropylation reaction was substantially complete. The hydroxypropyl cellulose had M.S. about 4.

The solvent toluene (280) ml.) was decanted. The crude hydroxypropyl cellulose was then methylated by adding 49 g. of NaOH, 22 g. of water, 210 g. of methyl chloride and 400 ml. hexane. The reaction was carried out at 60° C. for 1 hour and 70° C. for 3 hours.

Upon completion of the reaction, the excess methyl chloride (140 g.) was recovered by dissolving in hexane and cooling with methanol and dry ice. The methyl hydroxypropyl cellulose product was slurried in warm water (60° C).

The slurry was kept acidic by addition of small amounts of acetic acid. The pH of the slurry was finally adjusted to 7.0.

The product was washed with warmer water three times and dried at 70° C. The product had a D.S. of about 2.5.

EXAMPLE 2

A slurry of 50 g. of finely cut cellulose in 500 g. of hexane, 10 ml. of water and 6 g. of NaOH was stirred for 1 hour at 25° C. This alkali cellulose was added to a pressure reactor along with 150 g. of propylene oxide and 40 g. of methyl bromide. The air was purged from the reactor with nitrogen. The resulting charge was heated to 75° C. in 30 minutes and then reacted at this temperature for 1 hour, at 85° C. for 1 hour, and at 95° C. for 4 hours. At this stage, a small amount of product was purified by washing with hot water (85°–90° C.) and neutralized with acetic acid. The product had M.S. of 5.0 and D.S. of 0.5 The Brookfield viscosity of a 1% aqueous solution of the product at 25° C. was 2100 cps.

Upon completion of the hydroxypropylation, this crude methyl hydroxypropyl cellulose ether was directly reacted with 400 g. of methyl bromide along with 55 g. of NaOH and 25 ml. of water. The methylation was carried out at 70° C. for 4 hours the resulting solid product was then washed with warm water. The slurry was kept acidic to phenolphthalein by addition of acetic acid in small amounts as needed. The pH of the slurry was finally adjusted to 7.0. The product was washed substantially free of salt impurities with warm water (60° C.); the water was then decanted and the product dried at 100° C. The resulting product had D.S. of 2.8.

EXAMPLE 3

This example differs primarily from the foregoing Examples in that dimethyl sulfate is used as the methylating agent.

A slurry of 20 g. cellulose pulp in 200 g. of toluene and 20 g. of 33% aqueous NaOH solution was stirred in a reaction vessel which was immersed in an ice bath (0°–5° C). After the slurry had been stirred for 1 hour at this temperature, the resulting alkali cellulose was reacted with 90 g. of propylene oxide at 85° C. for 1½ hours and at 95° C. for 4 hours.

After hydroxypropylation was complete the solvent toluene was removed by filtration from the resulting hydroxypropyl cellulose product. This hydroxypropyl cellulose filter cake was broken up and added to a pressure reactor along with 120 g. of dimethyl sulfate and 200 g. of hexane. The resulting mixture was heated at 70° C. for 5 hours. The methyl hydroxypropyl cellulose product was a solid suspended in the hexane.

The solvent hexane was removed by filtration and the filter cake was slurried in warm water (60° C). The methyl hydroxypropyl cellulose ether was recovered, purified and dried as in Example 2. The product has a M.S. of 3.8 and D.S. of 1.5

EXAMPLE 4

40 g. of cellulose, 14 g. of 25% aqueous NaOH solution and 600 ml. of toluene were mixed at 4° C. for one hour in a 2-liter pressure reactor. The air was purged from the reactor with nitrogen. Then 160 ml. of propylene oxide was added to the reaction vessel. The reactor was heated to 75° C. within 1 hour, then to 85° C. within 1 hour, and finally to 95° C. within 1 more hour. At this stage, the heating was discontinued and the solvent toluene was decanted.

This crude hydroxypropyl cellulose was then reacted with 150 g. of methyl chloride along with 60 g. of 60% aqueous NaOH solution and 500 ml. of hexane. The methylation was carried out at 70° C. for 2 hours.

Thereafter the methyl hydroxypropyl cellulose ether was purified as in Example 2. The resulting product has a M.S. of 2.5 and D.S. of 2.0.

EXAMPLE 5

40 g. of cellulose, 16 g. of 25% aqueous NaOH solution, and 500 ml. of toluene were mixed at 25° C for 2 hours in a pressure reactor. The air was purged from the reactor with nitrogen. Then 300 ml. of propylene oxide was added to the reaction vessel. The reactor was heated to 75° C within 1 hour, then to 85° C. within 1 hour, and finally to 95° C. within 1 more hour. The reactor was maintained at 95° C. for 4 hours. At this stage, the heating was discontinued and the solvent toluene was decanted.

This crude hydroxypropyl cellulose was reacted with 140 g. of methyl chloride and 60 g. of 50% aqueous NaOH solution and 600 ml. of hexane. The methylation was conducted at 75° C. for 3½ hours.

Thereafter the methyl hydroxypropyl cellulose ether was purified as in Example 2. The resulting product has a M.S. of 8.1 and D.S. of 1.8

What is claimed is:

1. The process which comprises treating an alkali cellulose with propylene oxide in an amount of from 1 to 8 parts by weight propylene oxide per part of cellulose at a temperature not in excess of 110° C until the propylene oxide is substantially fully reacted, and subsequently treating said cellulose with from 1 to 9 parts by weight methylating material selected from the group of methyl halides and methyl salts per part of cellulose at a temperature from 40° C to 75° C until the etherification is substantially complete, to produce a methyl hydroxypropyl cellulose ether with a degree of molar substitution of hydroxypropyl groups of 2.5 to 8 and degree of substitution of methyl groups of 1.0 to 2.4 which is able to gel an organic solvent having a solubility parameter from about 8 to about 16 or an organic solvent-water mixture in which the organic solvent has a solubility parameter from about 8 to about 16, said mixture containing less than about 60% water.

2. The process of claim 1 wherein the methylating material is methyl chloride.

3. The process of claim 1 wherein the methylating material is methyl bromide.

4. The process of claim 1 wherein the methylating material is dimethyl sulfate.

5. A cellulose ether having a degree of molar substitution of hydroxypropyl groups of 2.5 to 8 and a degree of substitution of methyl groups of 1.0 to 2.4 which can gel an organic solvent-water mixture in which the organic solvent has a solubility parameter from about 8 to about 16 and said mixture contains less than about 60% water.

* * * * *